United States Patent
Liu et al.

(10) Patent No.: US 7,021,276 B2
(45) Date of Patent: Apr. 4, 2006

(54) CONTROL STRATEGY FOR HCCI-CD COMBUSTION IN A DIESEL ENGINE USING TWO FUEL INJECTION PHASES

(75) Inventors: Zhengbai Liu, Naperville, IL (US); Puning Wei, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 97 days.

(21) Appl. No.: 10/809,254

(22) Filed: Mar. 25, 2004

(65) Prior Publication Data

US 2005/0211218 A1    Sep. 29, 2005

(51) Int. Cl.
*F02B 1/14* (2006.01)
*B60T 7/12* (2006.01)

(52) U.S. Cl. ..................... 123/299; 123/305

(58) Field of Classification Search ........... 123/299, 123/300, 305, 431, 436, 698, 443; 701/103, 701/104, 105
See application file for complete search history.

(56) References Cited

U.S. PATENT DOCUMENTS

| | | |
|---|---|---|
| 5,785,031 A | 7/1998 | Akimoto et al. |
| 5,832,880 A | 11/1998 | Dickey |
| 5,875,743 A | 3/1999 | Dickey |
| 5,881,693 A | 3/1999 | Mizuno |

(Continued)

OTHER PUBLICATIONS

C. Vafidis, "The Application Of An Electro-Hydraulic VVA System On A Passenger Car C.R. Diesel Engine," Paper 20A2011, ATA Congress on The Future of Diesel Engine Technology for Passenger Cars, Porto Cervo, Italy, Oct. 12-13, 2000.

(Continued)

*Primary Examiner*—Hai Huynh
(74) *Attorney, Agent, or Firm*—Dennis Kelly Sullivan; Susan L. Lukasik; Jeffrey P. Calfa

(57) ABSTRACT

A compression ignition engine (20) has a control system (26) for processing data, one or more combustion chambers (22), and fuel injectors (24) for injecting fuel into the combustion chambers. The control system controls fueling using a result of the processing of certain data, such as engine speed and engine load, to select one of two fueling modes (HCCI, HCCI-CD) for operating the engine. When the result of the processing selects the HCCI mode, the engine is fueled to cause homogeneous-charge compression-ignition (HCCI) combustion within the combustion chambers. When the result of the processing selects the HCCI-CD mode, the engine is fueled to create a substantially homogeneous combustible charge within each combustion chamber that is compressed to auto-ignition, and after auto-ignition, more fuel is injected to provide additional combustion in the manner of the conventional diesel combustion.

12 Claims, 4 Drawing Sheets

U.S. PATENT DOCUMENTS

| | | | |
|---|---|---|---|
| 5,896,840 A | 4/1999 | Takahashi | |
| 5,937,822 A | 8/1999 | Nakajima | |
| 5,992,372 A | 11/1999 | Nakajima | |
| 6,386,177 B1 * | 5/2002 | Urushihara et al. | 123/299 |
| 6,390,054 B1 | 5/2002 | Yang | |
| 6,505,601 B1 * | 1/2003 | Jorach et al. | 123/295 |
| 6,561,157 B1 * | 5/2003 | zur Loye et al. | 123/295 |
| 6,668,789 B1 * | 12/2003 | Marriott et al. | 123/295 |
| 6,684,849 B1 | 2/2004 | zur Loye et al. | |
| 6,684,852 B1 * | 2/2004 | Wright et al. | 123/295 |
| 6,863,058 B1 * | 3/2005 | Kurtz et al. | 123/672 |
| 6,957,640 B1 * | 10/2005 | Liu et al. | 123/305 |
| 2004/0182359 A1 | 9/2004 | Stewart et al. | |
| 2005/0284441 A1 * | 12/2005 | Liu et al. | 123/295 |
| 2005/0288846 A1 * | 12/2005 | Liu et al. | 701/104 |

OTHER PUBLICATIONS

P. Wolters, W. Salber, J. Geiger, M. Duesmann and J. Dilthey, "Controlled Auto Ignition Combustion Process with an Electromechanical Valve Train," Paper 2003-01-0032, SAE International, 2003 SAE World Congress, Detroit, Michigan, Mar. 3-6, 2003.

* cited by examiner

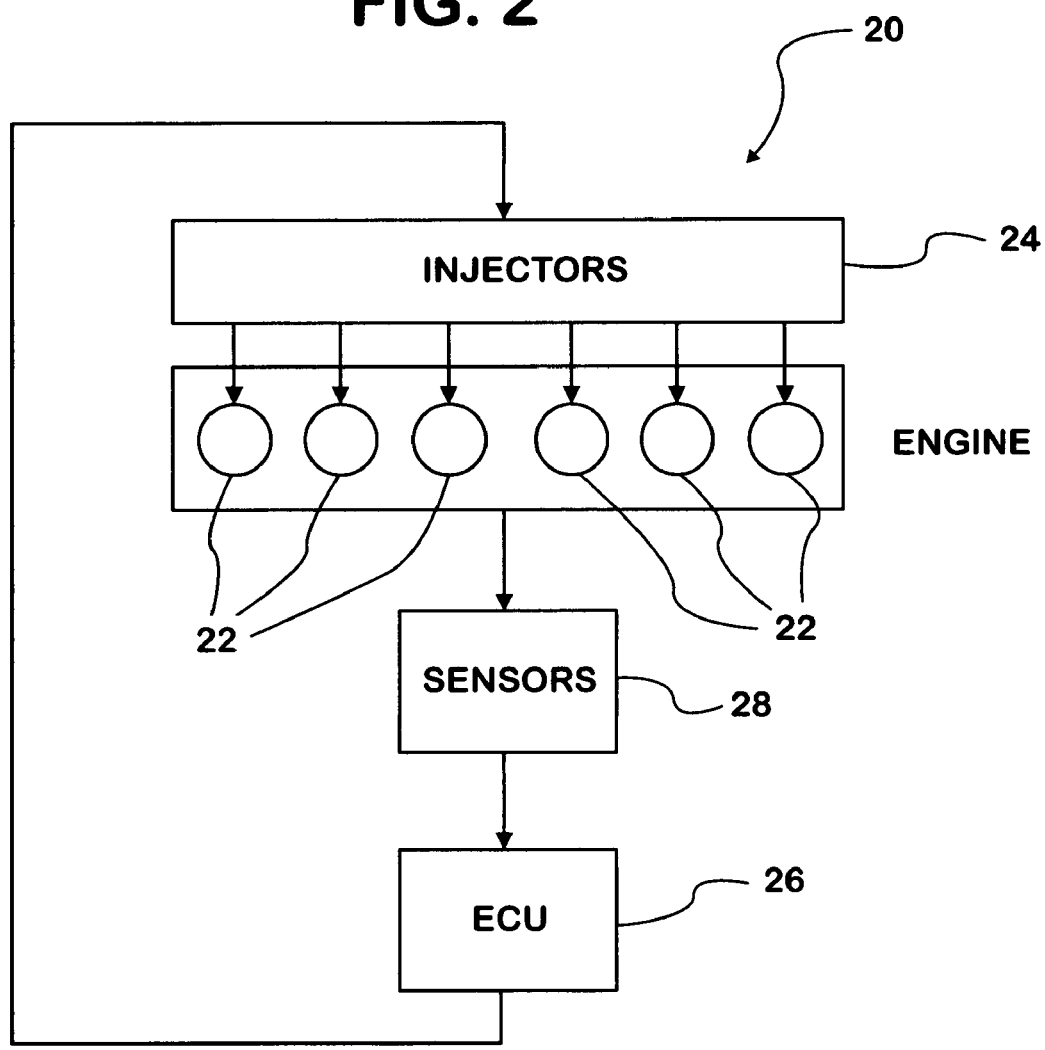

US 7,021,276 B2

CONTROL STRATEGY FOR HCCI-CD COMBUSTION IN A DIESEL ENGINE USING TWO FUEL INJECTION PHASES

FIELD OF THE INVENTION

This invention relates generally to internal combustion engines. More specifically it relates to a control strategy for selectively utilizing homogeneous-charge compression-ignition (HCCI) in a way that takes advantage of HCCI's attributes in different ways during different modes of engine operation.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a substantially homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_X$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by scientists and engineers.

One aspect of HCCI seems to impose a limit on the extent to which it can provide drastically reduced tailpipe emissions of soot and $NO_X$. At higher engine speeds and larger engine loads, the rate of combustion is difficult to control. Consequently, known engine control strategies may utilize HCCI only at relatively lower speeds and smaller engine loads. At higher speeds and/or larger loads, the engine is fueled so that the fuel combusts by conventional diesel (CD) combustion.

The nature of a diesel engine and the commercial availability of fuel injection systems that can control fuel injection with great precision allow fuel to be injected as a series of individual injections during an engine cycle. Hence known fueling systems in diesel engines can serve to control injection of fuel for both CD combustion and HCCI combustion.

CD fuel injection during an engine cycle is sometimes described by its particular fueling pulses, such as pilot injection pulses, main injection pulses, and post-injection pulses. Any particular fuel injection process typically always comprises at least one main fuel injection pulse, with one or more pilot and/or post-injection pulses being optional possibilities.

Contemporary fuel injection systems allow injection pressure, injection rate, and injection timing to be controlled with high degrees of precision so that fuel can be injected into a cylinder in precise quantities at precise times during an engine cycle. That is why known fuel injection and associated processing systems can handle both CD and HCCI combustion.

As will be explained by later description, the present invention takes advantage of the capabilities of those fuel injection and processing systems to control fuel injections in different ways depending on certain aspects of engine operation. Exactly how any particular fuel injection system will be controlled by an associated processing system in any given engine will depend on specifics of the engine, the fuel injection system, and the processing system.

Because a diesel engine that powers a motor vehicle runs at different speeds and loads depending on various inputs to the vehicle and engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

SUMMARY OF THE INVENTION

The present invention relates to an engine, system, and method for enhancing the use of HCCI combustion in a diesel engine toward objectives that include reducing the generation of undesired constituents in engine exhaust, especially soot and $NO_X$, and improving thermal efficiency. The invention is embodied in the fuel injection control strategy, a strategy that is programmed in an associated processing system.

One generic aspect of the present invention relates to a method of operating a compression ignition engine by processing certain data to select one of plural fueling modes for operating the engine. When a result of the processing selects a first fueling mode, the engine is fueled during an engine cycle to create a substantially homogeneous air-fuel charge within one or more combustion chambers. That charge is compressed to combust by auto-ignition, with no more fuel being introduced after auto-ignition. When a result of the processing selects a second fueling mode, the engine is fueled during an engine cycle to create a substantially homogeneous air-fuel charge within the one or more combustion chambers. That charge is compressed to combust by auto-ignition, after which more fuel is introduced into the one or more combustion chambers to provide additional combustion.

Another generic aspect of the invention relates to a compression ignition engine that has a control system for processing data, one or more combustion chambers, and a fueling system for introducing fuel into the one or more combustion chambers. The control system controls the fueling system using a result of the processing of certain data by the control system to select one of plural fueling modes for operating the engine. When the result of the processing selects a first fueling mode, the engine is fueled during an engine cycle to create a substantially homogeneous air-fuel charge within the one or more combustion chambers. That charge is compressed to combust by auto-ignition, with no more fuel being introduced after auto-ignition. When the result of the processing selects a second fueling mode, the engine is fueled during an engine cycle to create a substantially homogeneous air-fuel charge within the one or more combustion chambers. That charge is compressed to combust by auto-ignition, after which more fuel is introduced to provide additional combustion.

Still another generic aspect relates to a method of operating a compression ignition engine by performing a succession of steps during an engine cycle. The steps include: a) injecting diesel fuel into a combustion chamber during a compression phase of the cycle to create a substantially homogeneous combustible charge; b) compressing the charge to a pressure at which the charge will auto-ignite; and c) injecting more diesel fuel into the combustion chamber after auto-ignition of the charge to provide additional combustion.

A further generic aspect relates to a compression ignition engine comprising a control system for processing data, a combustion chamber, and a fueling system for injecting diesel fuel into the combustion chamber. The control system controls the fueling system's injection of diesel fuel into the combustion chamber during a compression phase of each of successive engine cycles a) to cause creation of a substantially homogeneous combustible charge and compression of the charge to a pressure at which the charge will auto-ignite, and b) then to cause the injection of more diesel fuel into the combustion chamber to provide additional combustion.

In one disclosed embodiment of the invention, the certain data that is processed comprises engine speed data and engine load data. In another embodiment, the processing of the engine speed data is unnecessary.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 2 is a general schematic diagram of portions of an exemplary diesel engine relevant to principles of the present invention.

DESCRIPTION OF THE PREFERRED EMBODIMENT

Figure 1A:
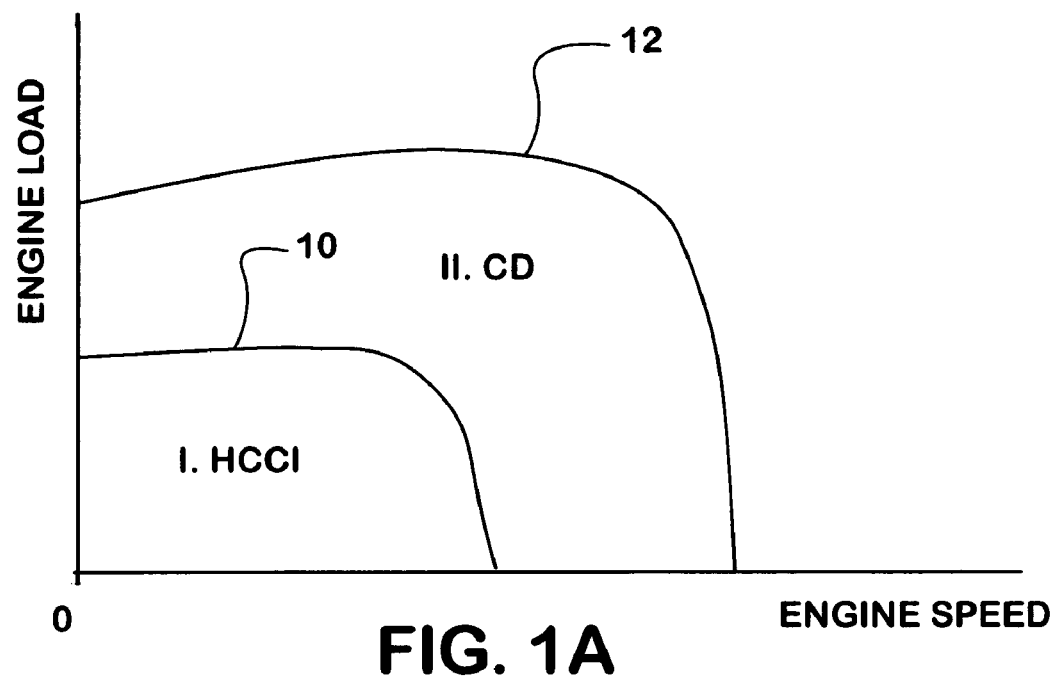
FIG. 1A is a representative graphic portrayal of known fueling strategy comprising HCCI combustion for some speed-load conditions and CD combustion for other speed-load conditions.

FIG. 1A is a graph whose vertical axis represents engine load and whose horizontal axis represents engine speed. At the origin of the graph, engine load is zero, and engine speed is zero. Respective solid lines 10 and 12 demarcate two zones labeled I. HCCI and II. CD.

Zone I covers an area that encompasses various combinations of relatively smaller engine loads and relatively lower engine speeds. Zone II covers an area that encompasses various combinations of relatively larger engine loads and relatively higher engine speeds. When a compression ignition engine is operating at a speed and load that falls within Zone I, fuel is injected into the engine cylinders in a manner that creates HCCI combustion. When the engine is operating at a speed and load that falls within Zone II, fuel is injected into the engine cylinders in a manner that creates CD combustion.

Figure 1B:
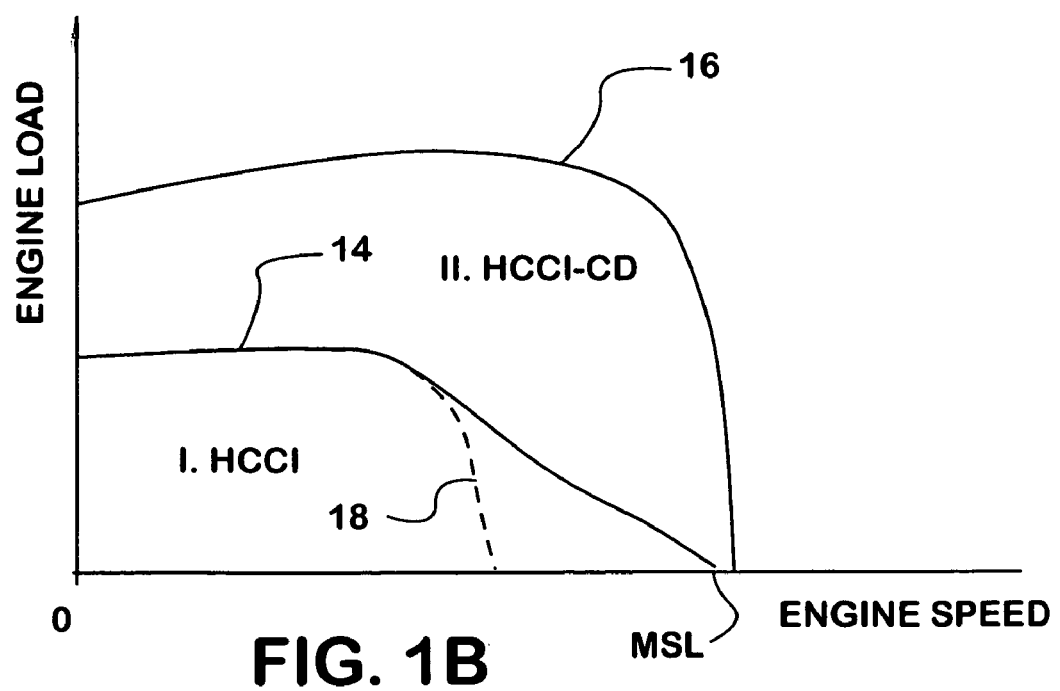
FIG. 1B is a representative graphic portrayal of fueling strategy in accordance with principles of the present invention comprising an HCCI combustion mode for some speed-load conditions and an HCCI-CD combustion mode for other speed-load conditions.

FIG. 1B is a second graph similar to that of FIG. 1A in that the vertical axis represents engine load and the horizontal axis represents engine speed. At the origin of the graph, engine load is zero, and engine speed is zero. Respective solid lines 14 and 16 demarcate two zones labeled I. HCCI and II. HCCI-CD.

Zone I of FIG. 1B is divided into two-subzones by a broken line 18. One sub-zone to the left of line 18 covers an area that is essentially the same as Zone I of FIG. 1A, encompassing substantially the same combinations of relatively smaller engine loads and relatively lower engine speeds as in FIG. 1A. The other sub-zone to the right of line 18 extends HCCI combustion to combinations of even higher engine speeds but smaller engine loads. Zone I of FIG. 1B is an inner zone that bounds the origin of the graph while zone II is an outer zone that bounds zone I.

When the engine is operating at a speed and load that falls within either sub-zone of Zone I of FIG. 1B, fuel is injected into the engine cylinders in a manner that creates HCCI combustion (HCCI mode). When the engine is operating at a speed and load that falls within Zone II however, fuel is injected into the engine cylinders a manner that creates HCCI-CD combustion (HCCI-CD mode).

FIG. 2 shows schematically a portion of an exemplary diesel engine 20 operating in accordance with the inventive strategy for powering a motor vehicle. Engine 20 comprises cylinders 22 within which pistons reciprocate. Each piston is coupled to a respective throw of a crankshaft by a corresponding connecting rod. Intake air is delivered to each cylinder through an intake system when a respective intake valve is open.

The engine has a fueling system that comprises fuel injectors 24 for the cylinders 22. The engine also has a processor-based engine control unit (ECU) 26 that processes data from various sources to develop various control data for controlling various aspects of engine operation. The data processed by control system 22 may originate at external sources, such as various sensors 28, and/or be generated internally. Examples of data processed may include engine speed, intake manifold pressure, exhaust manifold pressure, fuel injection pressure, fueling quantity and timing, mass airflow, and accelerator pedal position.

ECU 26 controls the injection of fuel into cylinders 22 by controlling the operation of the fueling system, including controlling the operation of fuel injectors 24. The processing system embodied in ECU 26 can process data sufficiently fast to calculate, in real time, the timing and duration of device actuation to set both the timing and the amount of each injection of fuel into a cylinder. Such control capability is used to implement the inventive strategy.

Regardless of how data values for engine speed and engine load are developed, one embodiment of the invention uses instantaneous engine speed and instantaneous engine load to select the particular fueling mode for the engine, either the HCCI mode for creating HCCI combustion (Zone I of FIG. 1B) or the HCCI-CD mode for creating HCCI-CD combustion (Zone II of FIG. 1B), and to then operate the fueling system to fuel the engine according to the strategy of the selected fueling mode. Another embodiment uses only engine load.

Figure 3:
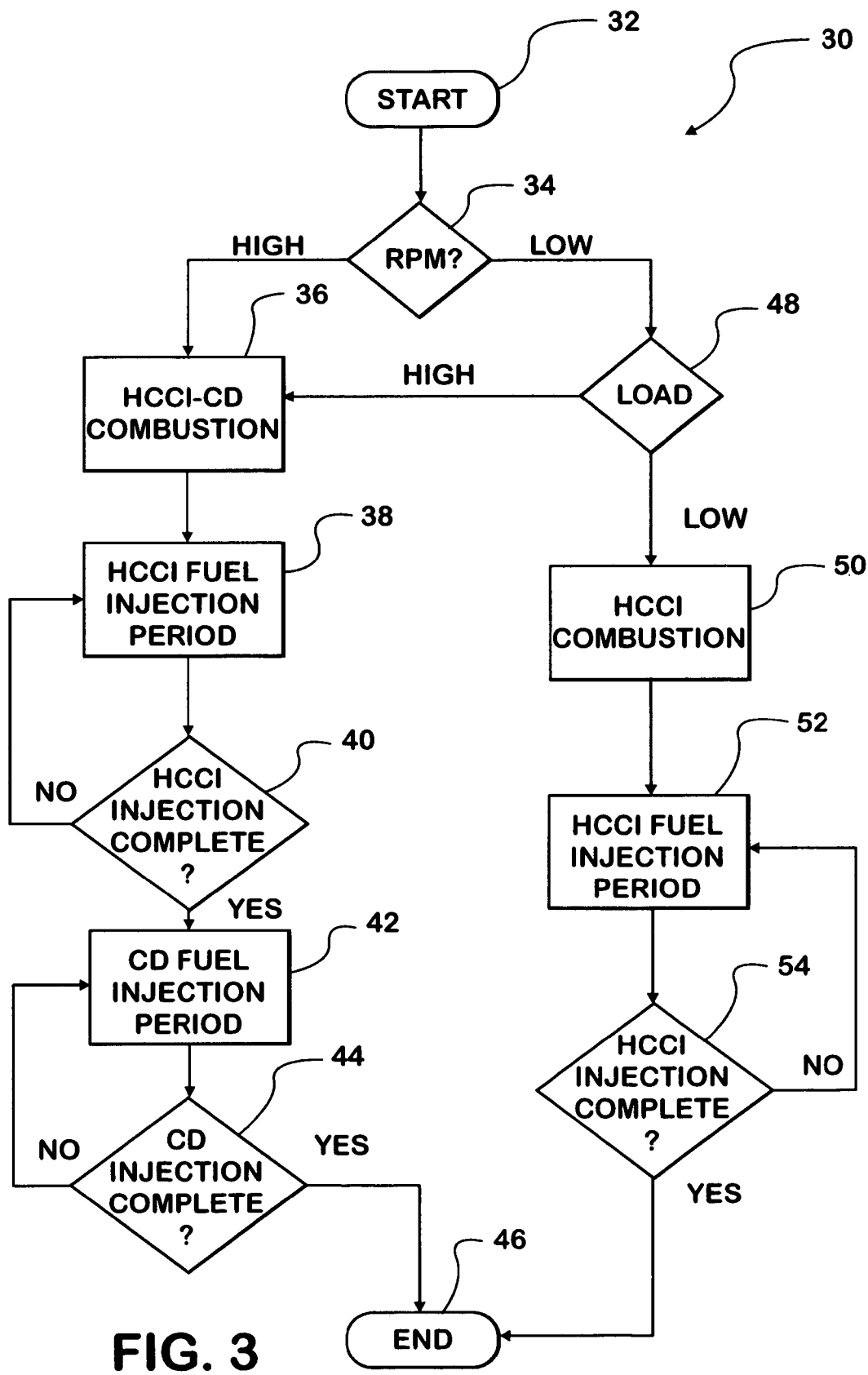
FIG. 3 is a flow diagram illustrating an embodiment of the inventive strategy.

FIG. 3 shows a flow diagram 30 for the inventive strategy as executed by the processing system of ECU 26. The flow diagram represents one iteration of the strategy during one engine cycle for one cylinder. The reference numeral 32 represents the start of the iteration. A step 34 determines if engine speed is higher than a selected maximum speed limit above which HCCI combustion is not allowed. That maximum limit corresponds to the point MSL in FIG. 1B.

Figure 4:
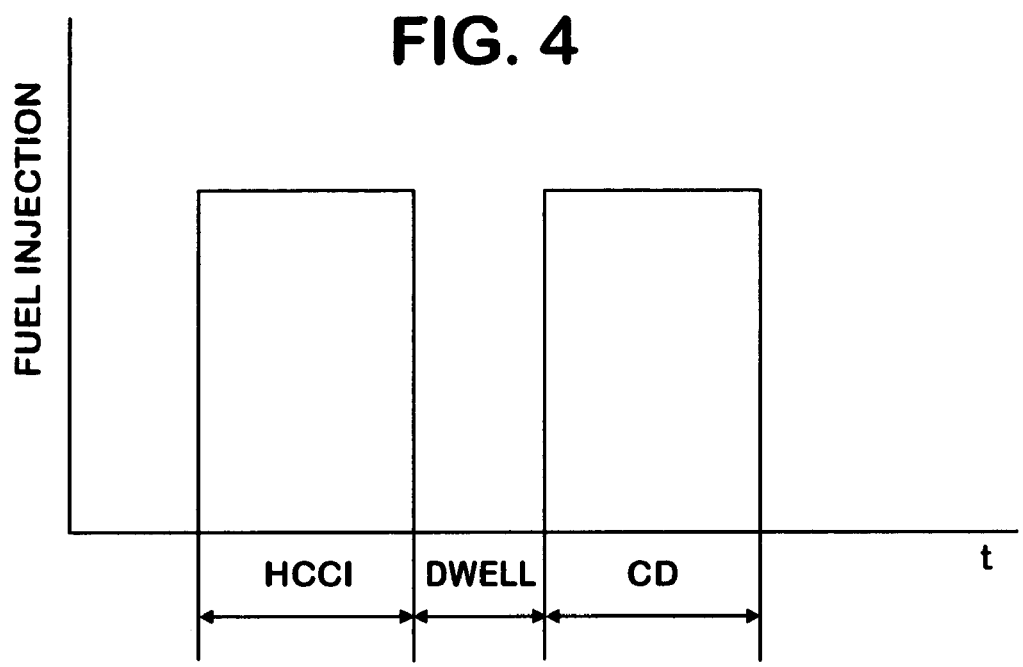
FIG. 4 is a representative graphic portrayal illustrating the HCCI-CD fueling aspect of the inventive strategy.

If step 34 determines that engine speed is higher than speed MSL, diagram 30 discloses that fuel will be injected to create HCCI-CD combustion, reference numeral 36. FIG. 4 illustrates an example of fueling for HCCI-CD combustion. It may be considered to have two phases: an HCCI phase and a CD phase.

The HCCI phase may have one or more discrete injections. Regardless of the number of discrete injections, the HCCI phase introduces fuel into a cylinder during a compression upstroke of the piston that reciprocates in the cylinder. The fuel mixes with charge air that entered the cylinder during the immediately preceding intake downstroke and early portion of the compression upstroke, and the resulting air-fuel mixture is a substantially homogeneous one. The HCCI phase fueling concludes before any combustion occurs. When the charge has been compressed sufficiently to auto-ignite, the HCCI combustion commences.

The CD phase may also have one or more discrete injections, but regardless of the particular number, the CD phase causes more fuel to be introduced into the cylinder after the HCCI combustion commences. The introduction of that additional fuel is like conventional diesel injection and provides more combustion, and hence release of more energy for operating the engine at the higher speeds and loads that zone II of FIG. 1B encompasses.

In FIG. 3, flow diagram 30 shows a first step 38 of the HCCI-CD mode to comprise commencement of the HCCI phase. A step 40 determines when the HCCI phase is complete. The next step 42 is commencement of the CD-phase. A step 44 determines when the CD phase is complete, after which the iteration ends as indicated by the reference numeral 46.

When step 34 determines that engine speed is not larger than MSL, a step 48 determines if, for the particular instantaneous engine speed, engine load is larger than the load defined by line 14. If it is, then fueling is performed according to the HCCI-CD mode. If it is not, then fueling is performed according to the HCCI mode, reference numeral 50.

A first step 52 represents commencement of the HCCI mode. A step 54 determines when the HCCI mode is complete, after which the iteration ends as indicated by the reference numeral 46.

Figure 5:
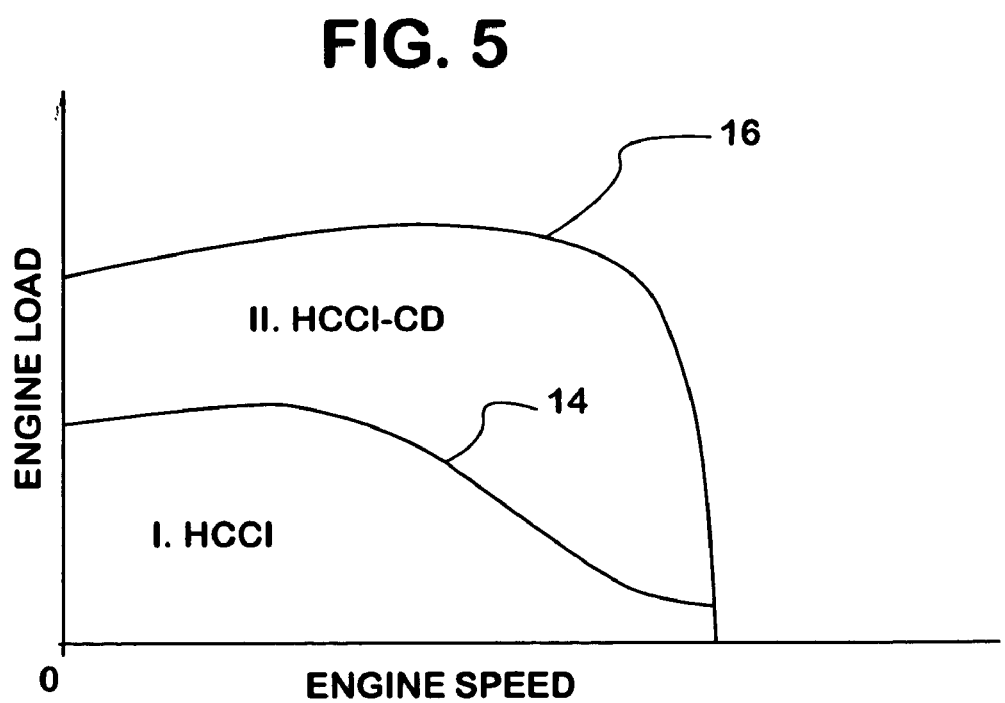
FIG. 5 is another representative graphic portrayal of fueling strategy in accordance with principles of the present invention comprising HCCI combustion for some speed-load conditions and HCCI-CD combustion for other speed-load conditions.

In the example shown by FIG. 5, the HCCI mode is possible at all engine speeds, but only at certain engine loads. Hence, engine load by itself is determinative of whether the HCCI mode or the HCCI-CD mode is selected. In that case step 34 of flow diagram 30 would be unnecessary. After the start (reference numeral 32), the flow diagram goes directly to the step 48 to determine the engine load.

Another manner of selecting the mode is by using one or more maps in the processing system to define the zones I and II and comparing data values for instantaneous engine speed and engine load against the maps.

FIG. 4 shows that a distinct dwell is present between the HCCI phase and the CD phase. The duration of the CD phase can be shorter than, equal to, or longer than that of the HCCI phase, depending on the engine load, as measured in crankshaft degrees. Dwell between the two phases can also vary, depending on the engine load. The quantity of fuel injected during the HCCI phase may be smaller than, equal to, or greater than that injected during the CD phase. Likewise, the fuel injection pressure during the HCCI phase may be smaller than, equal to, or greater than that during the CD phase.

The invention has the following advantages:
1) It can concurrently reduce $NO_X$ and soot.
2) It has high thermal efficiency.
3) It can cover the whole operating range of an engine.
4) It can be used in heavy-duty, medium-duty, and light-duty diesel engines.
5) The invention can be implemented in the processor alone, provided that the processor has sufficient capacity, and this makes the invention quite cost-effective.

While a presently preferred embodiment of the invention has been illustrated and described, it should be appreciated that principles of the invention apply to all embodiments falling within the scope of the following claims.

What is claimed is:

1. A method of operating a compression ignition engine comprising:
    processing certain data to select one of plural fueling modes for operating the engine, and
        a) when the result of the processing selects a first fueling mode, fueling the engine during an engine cycle to create a substantially homogeneous air-fuel charge within one or more combustion chambers and compressing the charge to auto-ignition without introducing any additional fuel after auto-ignition, and
        b) when the result of the processing selects a second fueling mode, fueling the engine during an engine cycle to create a substantially homogeneous air-fuel charge within the one or more combustion chambers, compressing the charge to auto-ignition, and introducing more fuel after auto-ignition to provide additional combustion.

2. A method as set forth in claim 1 wherein the step of processing certain data to select one of plural fueling modes for operating the engine comprises
    processing data indicative of engine load.

3. A method as set forth in claim 2 wherein the step of processing certain data to select one of plural fueling modes for operating the engine comprises
    processing data indicative of engine speed.

4. A method as set forth in claim 1 wherein in a graph of engine speed vs. engine load whose origin corresponds to zero speed and zero load, step a) occurs at engine speeds and loads within a first zone of the graph that bounds the origin, and step b) occurs at engine speeds and loads within a second zone that bounds the first zone.

5. A method as set forth in claim 1 wherein the step b) comprises
providing a dwell between the step of fueling the engine to create a substantially homogeneous air-fuel charge and the step of introducing more fuel after auto-ignition of that charge.

6. A method as set forth in claim 1 wherein in the second fueling mode, the step of fueling the engine to create a substantially homogeneous air-fuel charge and the step of introducing more fuel both comprise injecting fuel by a fuel injection system, with the injection pressure that creates a substantially homogeneous air-fuel charge being at least as great as the injection pressure that introduces more fuel.

7. A compression ignition engine comprising:
a control system for processing data;
one or more combustion chambers; and
a fueling system for injecting fuel into the one or more combustion chambers;
wherein the control system controls the fueling system using a result of the processing of certain data by the control system to select one of plural fueling modes for operating the engine such that a) when the result of the processing selects a first fueling mode, the engine is fueled during an engine cycle to create a substantially homogeneous air-fuel charge within one or more combustion chambers that is compressed to auto-ignition, with no more fuel being introduced after auto-ignition, and b) when the result of the processing selects a second fueling mode, the engine is fueled during an engine cycle to create a substantially homogeneous air-fuel charge within the one or more combustion chambers that is compressed to auto-ignition, after which more fuel is introduced to provide additional combustion.

8. An engine as set forth in claim 7 wherein the certain data comprises data indicative of engine load.

9. An engine as set forth in claim 8 wherein the certain data comprises data indicative of engine speed.

10. An engine as set forth in claim 7 wherein in a graph of engine speed vs. engine load whose origin corresponds to zero speed and zero load, the first fueling mode occurs at engine speeds and loads within a first zone of the graph that bounds the origin, and the second fueling mode occurs at engine speeds and loads within a second zone that bounds the first zone.

11. An engine as set forth in claim 7 wherein in the second fueling mode, the control system provides a dwell between the creation of a substantially homogeneous combustible charge within the one or more combustion chambers and the injection of more fuel into the one or more combustion chambers.

12. An engine as set forth in claim 7 wherein in the second fueling mode, fuel is introduced by fuel injection both before and after auto-ignition, with injection pressure before auto-ignition being at least as great as injection pressure after auto-ignition.

* * * * *